United States Patent [19]
Robbins

[11] 3,988,116
[45] Oct. 26, 1976

[54] APPARATUS FOR COUNTERCURRENT LIQUID-LIQUID EXTRACTION

[75] Inventor: Lanny A. Robbins, Midland, Mich.

[73] Assignee: The Dow Chemical Company, Midland, Mich.

[22] Filed: Feb. 27, 1975

[21] Appl. No.: 553,714

[52] U.S. Cl. .......................... 23/270.5 T; 196/14.52
[51] Int. Cl.² ........................................ B01D 11/04
[58] Field of Search ................ 23/270.5, 270, 267; 202/158; 261/113, 114 TC; 196/14.52

[56] References Cited
UNITED STATES PATENTS

| | | | |
|---|---|---|---|
| 2,000,606 | 5/1935 | Othmer | 23/270.5 T |
| 2,153,507 | 4/1939 | Mann | 23/270.5 T |
| 3,468,633 | 9/1969 | Honchar | 23/270 R |

FOREIGN PATENTS OR APPLICATIONS

| | | | |
|---|---|---|---|
| 145,698 | 3/1931 | Switzerland | 23/270.5 |

*Primary Examiner*—Stephen J. Emery
*Attorney, Agent, or Firm*—V. Dean Clausen

[57] ABSTRACT

Disclosed is a sieve tray extraction column useful for performing liquid-liquid extractions. The sieve trays are made in the form of tubular members with an open top end and one or more openings in the bottom end and in the side of the member. Each tubular member is of smaller diameter than the column and is sealed to the inside of the column wall at the top end only. An annular space is thus defined between each tubular member and the inner column wall. In this structure the annular space functions as an upcomer or downcomer for passage of the solvent liquid through the column.

3 Claims, 1 Drawing Figure

U.S. Patent  Oct. 26, 1976  3,988,116
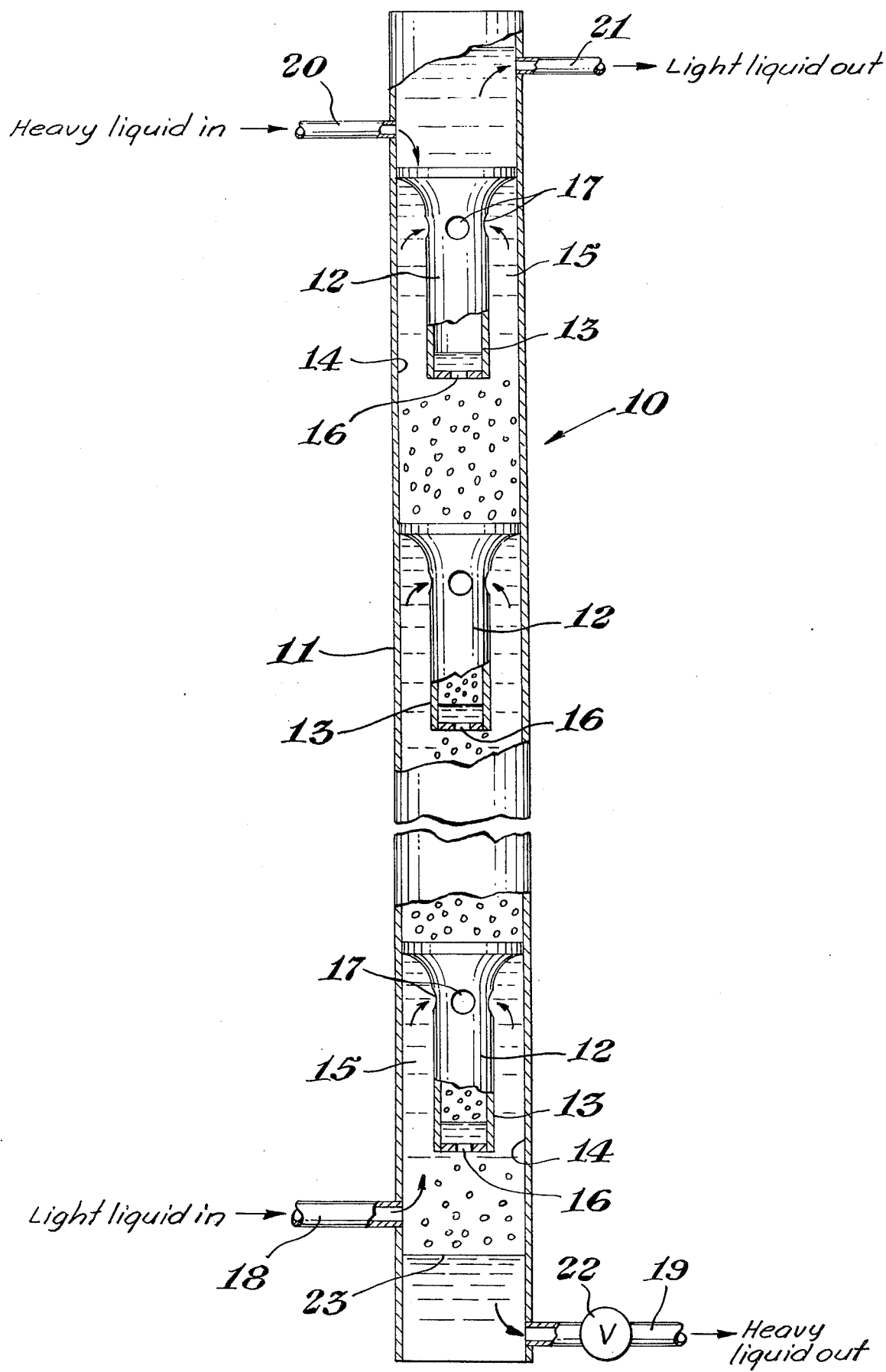

APPARATUS FOR COUNTERCURRENT LIQUID-LIQUID EXTRACTION

BACKGROUND OF THE INVENTION

The invention relates broadly to liquid-liquid extractions. More specifically, the invention is directed to an improved sieve tray column, for performing liquid-liquid extractions.

In a liquid-liquid extraction, also referred to as solvent extraction, the objective is to remove one or more components from a liquid mixture by intimate contact with a second liquid. The second liquid is thus immiscible with the liquid mixture, but it functions as a solvent for removing the components from the mixture. A conventional apparatus widely used for performing liquid-liquid extractions is known as a sieve tray column, sometimes referred to as a perforated plate column.

A typical sieve tray extraction column consists of a vertical cylindrical column which includes a series of spaced apart, perforated trays, which are positioned horizontally from top to bottom in the column. A solid vertical plate is attached to one side of each perforated tray. The vertical plates are positioned on opposite sides of each tray, such that they define a staggered pattern within the column. Each plate extends from the tray to which it is attached to a point above or below the next tray. Each of the vertical plates is also spaced from the inner surface of the column wall, so that a conduit is provided for liquid to flow in a side-to-side path from one tray to the next. This conduit is referred to as an upcomer or a downcomer, depending on flow direction of the solvent liquid in the column. The column also includes an entrance port and an exit port, both at the top and at the bottom of the column. This enables a countercurrent flow of the immiscible liquids within the column.

In a typical procedure for column extraction, the liquid that is divided into droplets is referred to as the dispersed phase liquid, and the other liquid is known as the continuous phase liquid. To give an example of this procedure, assume that the heavier liquid (the more dense liquid) is the dispersed phase. The heavier liquid is passed into the column through the entrance port at the top. The lighter liquid (the less dense liquid) is pumped under pressure into the column through the entrance at the bottom.

As the heavier liquid flows downwardly in the column it passes through the holes in each tray. At the same time the lighter liquid flows upwardly (countercurrent) in the column through the conduit space defined between each of the vertical plates and the column wall. In its downward flow the heavier liquid coalesces at the top surface of each tray and then breaks up into droplets as it flows through the tray openings. The droplets thus form a dispersed phase within the upwardly flowing continuous phase liquid.

The heavier liquid collects at the very bottom of the column, where it forms an interface with the lighter liquid. The liquid-liquid interface is defined just below the entrance port for the lighter liquid. This enables continuous removal of the heavier liquid through an exit port below the interface level. At the same time, the lighter liquid is continuously drawn off through an exit port at the top of the column.

According to conventional practice there are many situations in which it is desirable to disperse the lighter liquid, rather than utilizing it as a continuous phase. This can readily be done by inverting the column. For example, when the column is inverted the lighter liquid becomes the dispersed phase by passing upwardly through the sieve trays. At the same time, the heavier liquid becomes the continuous phase as it flows through the downcomer countercurrent to the dispersed phase.

Before a production size extraction column or tower is built, the usual practice is to obtain design data by duplicating the extraction procedure in a small scale unit. To obtain useful data from the small scale unit, it is essential for certain structural features to be the same in the small scale unit as in the production apparatus. For example, the perforations in the sieve trays of each column must have the same diameter and they must be arranged in a similar pattern on the tray. Another feature which must correspond in each column is the actual area of the upcomer (or downcomer) in relation to the cross sectional area of the column.

As an example, typical engineering specifications call for the sieve tray openings to be about 1/8 to 1/4 inch diameter. The preferred arrangement of the openings is to position them on the corners of triangles or squares, with 1/2 to 3/4 inch spacing. The upcomer (or downcomer) space usually comprises about 10 to 40 per cent of the inside cross sectional area of the column.

The actual area will depend on the ratio of the flow rate of the continuous phase to the flow rate of the dispersed phase. One of the reasons given for these requirements is to prevent flooding of the column by entrainment. A simplified explanation of this problem is that the linear velocity of the continuous phase liquid, as it passes through the upcomer (or downcomer), must not exceed a certain limit. If this limit is exceeded, the dispersed phase liquid will become entrained in the continuous phase liquid and a subsequent recycling of the droplets will flood the column.

In small scale extraction columns it is difficult to maintain all of the engineering specifications which are called for in the larger, commercial-size columns. This problem applies particularly to extraction columns having an inside diameter which is less than about 6 inches. To cite a specific example, in a column with an inside diameter of about 1 inch the area taken up by the upcomer (or downcomer) represents a substantial portion of the total cross-sectional area of the column. In this structure, therefore, there is not enough clearance to space the opening in the tray at least 1/2 to 3/4 of an inch from the upcomer (or downcomer) and the column wall. The resulting wall effects on the liquid are especially important in the smaller diameter columns. The primary reason for this effect is that the droplets are much closer to the walls of the column and the upcomer (or downcomer) in the small columns than in the larger diameter columns.

Another problem is frequently encountered in small diameter columns. For example, in a column with an inside diameter of about 4 inches the ring support (or seal) which contacts the sieve tray with the column wall sometimes requires a ring of 1/2 inch thickness inside the column wall. This leaves a plate of 3 inch diameter, about 56 per cent of the cross-sectional area of the column, in which the tray openings and the upcomer (or downcomer) must be placed. The undesirable result is a severe restriction of the flow capacity of the column, in relation to larger diameter columns. Accordingly, the primary objective is to provide extraction columns of small diameter in which the extraction performance will correspond to that of the larger diameter columns.

SUMMARY OF THE INVENTION

An apparatus is provided which is useful for performing liquid-liquid extractions. A series of tubular members are positioned inside a vertical cylindrical column. Each tubular member is smaller in diameter than the vertical column, so that an annular space is defined between each tubular member and the column. The tubular members are open at the top end and each member is attached (or sealed) inside of the column at the periphery of the top end of the member. The tubular members also have one or more openings in the bottom and in the side of each member.

The column includes lower and upper liquid inlets and liquid outlets, which are positioned at the bottom and the top ends of the column. In a typical operation the column is adapted to receive a first liquid, which is carried upwardly through the annular space and the side openings in the tubular members. At the top of the column the liquid is discharged through the upper outlet. A second liquid is passed into the column through the upper inlet, is carried downwardly through each tubular member, and is discharged through the lower outlet. One of the liquids is utilized as the dispersed phase and the other as the continuous phase. Either liquid can be changed from dispersed phase to continuous phase, or vice versa, by inverting the column.

DESCRIPTION OF THE DRAWINGS

The single FIGURE of the drawing is a front view, mostly in section, of one embodiment of a column extractor according to this invention.

DESCRIPTION OF A PREFERRED EMBODIMENT

In the drawing the numeral 10 refers generally to one form of an extraction apparatus according to this invention. The apparatus 10 comprises basically a vertical cylindrical column 11 and several tubular members, indicated by numeral 12. Each of the tubular members 12 has an open, flared top end and each member is fastened to the inner wall surface 14 of column 11 at the periphery of the top end. That portion of each tubular member below the top end defines a stem portion having an outer wall surface 13, which has a smaller diameter than the inner wall surface 14 of column 11.

Between the outer wall surface 13 of each tubular member 12 and the inner wall surface 14 of column 11 is defined and annular space 15. The bottom end of each tubular member 12 has at least one opening therein, as shown at 16. The tubular members also include one or more side openings 17, which are located in the stem portion near the top of the member. The column 11 is closed both at the top end and at the bottom end.

Positioned near the bottom end of column 11 is a liquid inlet 18 and a liquid outlet 19. At the top end of the column there is also included a liquid inlet 20 and a liquid outlet 21. The outlet 19 may also include a valve 22, for regulating liquid outflow.

The present invention can be illustrated by describing a typical procedure for a liquid-liquid extraction. One example of such an extraction is the removal of acid impurities from dinitro-ortho-secondary butyl phenol. A suitable extraction solvent is water. In this procedure the phenol product is the more dense liquid and it is employed as the dispersed phase. The water, as the lighter liquid, is utilized as the continuous phase.

Referring to the drawing, the water is pumped continuously into the column 11 through the lower inlet 18. As the water enters column 11 it rises upwardly through the annular space 15 and passes through the side openings 17 in each tubular member. When the water level reaches the top of column 11 it will overflow through the outlet 21. Once the column 11 is filled to overflowing with water, the phenol product is continuously fed into the column through inlet 20.

When the heavier phenol product is passed into column 11 it settles to the bottom of the tubular member 12 which is located at the top of the column. From the top member 12, the phenol drops through the opening 16 and disperses, as droplets, into the water phase, as indicated in the drawing. As the dispersed phase phenol drops through each of the tubular members 12, the liquid coalesces above the opening 16 and then redisperses into droplets as it falls through the opening. After passing through each of the tubular members, the heavier phenol phase accumulates at the bottom of column 11. Above the bottom of the column the phenol form an interface 23 with the lighter water phase.

The objective is to maintain the liquid-liquid interface 23 above outlet 19, to enable removal of the extracted phenol through outlet 19. The liquid interface is maintained by continuously feeding the phenol product into the top of the column and the water solvent into the bottom of the column, and regulating withdrawal of the phenol raffinate with valve 22.

There are some extraction operations in which it may be desired to disperse the less dense liquid, rather than utilizing it as the continuous phase. An example of such an extraction is removal of acid impurities from methyl isobutyl ketone with water. In this instance the ketone product is the light liquid and the water is the heavy liquid.

To accomplish this extraction the column 11 is inverted. The water, as the continuous phase liquid, is fed into the column at the top. The water travels downwardly through the annular spaces 15 in column 11, through the side openings 17 in tubular members 12, and is drawn off at the bottom of the column. At the same time, the ketone product, as the dispersed phase liquid, is fed into column 11 at the bottom. The dispersed phase liquid then travels upwardly through the tubular members 12. At the top of column 11 the ketone and water form a liquid-liquid interface below the outlet 19. This enables the extracted ketone product to be removed from the column through outlet 19.

The extraction apparatus of this invention has several advantages over the prior sieve tray extraction columns. As mentioned above, a major drawback of the prior extraction columns, particularly the small diameter columns, is the limited amount of area within the column. Because of the limited space it is very difficult to lay out the tray perforations a sufficient distance from the column walls and upcomers (or downcomers) and still use the desired amount of area needed for the upcomers (or downcomers). In the column of the present invention the space problem has been overcome. For example, in this column the tray perforations can be positioned at least ½ inch from each other, and from column walls, without reducing the area needed for the upcomers (or downcomers).

The reason for the extra space in the present column is found in the design. Looking at the drawing it will be seen that the entire annular space 15, which is defined between the outer wall surface 13 of each tubular member 12 and the inner wall surface 14 of column 11, can function as an upcomer (or downcomer). The use of this annular space has a particular advantage in columns of less than about 6 inches in diameter, that is, the small scale units. For example, the perforations 16 in the sieve trays (tubular members 12) can be positioned at least ½ inch from the column wall 14. This eliminates any problem of flow capacity restriction in the column which could result from the ring or seal which contacts the column wall.

The concept of providing an annular space around each sieve tray in a column, which can function as an upcomer (or downcomer), should also have definite advantages in a production size column. A specific advantage would be to increase the flow capacity of the column. Another advantage of this concept over the prior art is the ease of fabricating the column, either as a small scale unit or a larger diameter column. In a small scale column it is preferred to fabricate the sieve trays in the form of a tubular member, as illustrated herein. For the larger diameter columns the sieve trays could be made in the form of tubular members, cup-shaped members, flat plates, or the like.

The invention claimed is:

1. An apparatus useful for liquid extraction, which includes the combination of:

a vertical cylindrical column which has an upper end, a lower end, and an inner wall surface, a series of tubular members, each tubular member being positioned within the column, each tubular member having an outer wall surface of smaller diameter than the inner wall surface diameter of the column, with an annular space being defined between the outer wall surface of each tubular member and the inner wall surface of the column, each tubular member having a top end with an opening therein and a bottom end with at least one opening therein, each tubular member being sealed to the inner wall surface of the column at the periphery of the top end, and each tubular member having at least one side opening in the outer wall surface of the tubular member;

the column including a lower liquid inlet and a lower liquid outlet, the said inlet and outlet being positioned near the bottom end of the column;

the column including an upper liquid inlet and an upper liquid outlet, the said inlet and outlet being positioned near the top end of the column;

the apparatus being adapted for receiving a first liquid into the column through the lower inlet, carrying the first liquid upwardly in the column through the annular space and through the side opening of each tubular member, and carrying the first liquid out of the column through the upper outlet; and the apparatus being further adapted for receiving a second liquid into the column through the upper inlet, carrying the second liquid downwardly in the column through the top and bottom openings of each tubular member, and carrying the second liquid out of the column through the lower outlet.

2. The apparatus of claim 1 in which each tubular member has several side openings in the outer wall surface thereof, and each tubular member has several openings in the bottom end thereof.

3. The apparatus of claim 1 in which the column is inverted, such that the end of each tubular member which is fastened to the inner wall surface of the column defines a bottom end.

* * * * *